(12) United States Patent
Watanabe

(10) Patent No.: US 9,377,174 B2
(45) Date of Patent: Jun. 28, 2016

(54) DISPLAY DEVICE

(71) Applicant: Sharp Kabushiki Kaisha, Osaka-shi, Osaka (JP)

(72) Inventor: Hisashi Watanabe, Osaka (JP)

(73) Assignee: SHARP KABUSHIKI KAISHA, Osaka (JP)

( * ) Notice: Subject to any disclaimer, the term of this patent is extended or adjusted under 35 U.S.C. 154(b) by 0 days.

(21) Appl. No.: 14/413,438

(22) PCT Filed: Jul. 2, 2013

(86) PCT No.: PCT/JP2013/068100
§ 371 (c)(1),
(2) Date: Jan. 8, 2015

(87) PCT Pub. No.: WO2014/010463
PCT Pub. Date: Jan. 16, 2014

(65) Prior Publication Data
US 2015/0211707 A1 Jul. 30, 2015

(30) Foreign Application Priority Data

Jul. 9, 2012 (JP) ................................. 2012-153654

(51) Int. Cl.
*F21V 5/00* (2015.01)
*G02F 1/1333* (2006.01)
(Continued)

(52) U.S. Cl.
CPC . *F21V 5/007* (2013.01); *F21V 5/04* (2013.01); *G02F 1/1339* (2013.01);
(Continued)

(58) Field of Classification Search
None
See application file for complete search history.

(56) References Cited

U.S. PATENT DOCUMENTS 6,927,908 B2 8/2005 Stark
7,443,463 B2 10/2008 Chang et al.
(Continued)

FOREIGN PATENT DOCUMENTS

JP 49-110668 U 9/1974
JP 05-323302 A 12/1993
(Continued)

OTHER PUBLICATIONS

Official Communication issued in International Patent Application No. PCT/JP2013/068100, mailed on Sep. 24, 2013.

*Primary Examiner* — Hilina K Demeter
(74) *Attorney, Agent, or Firm* — Keating & Bennett, LLP

(57) ABSTRACT

A display device which makes the frame hardly visible to the viewer is provided.
This display device includes: a display panel (10) having a display area (RA) and a frame area (RF) provided outside of the display area; and a light-transmitting cover (20) which is arranged closer to a viewer than the display panel is and which includes lens portions (22) that are arranged at positions corresponding to the boundary between the display area and frame area of the display panel. The display panel (10) has a planar shape which includes four sides (10*a*) that define upper, lower, right and left sides, respectively, and four corner portions (10*b*), each connecting two associated adjacent ones of the four sides together. The display panel further has a chamfered portion (10*c*) with a curved or straight edge which is arranged in at least one of the four corner portions inside of the intersection between extended lines of the two adjacent sides. And the light-transmitting cover (20) includes a corner lens portion, of which the planar shape matches the chamfered portion (10*c*) of the display panel, at a position corresponding to the corner portion (10*b*) of the display panel.

9 Claims, 14 Drawing Sheets

(51) Int. Cl.
  *G02F 1/1335* (2006.01)
  *F21V 5/04* (2006.01)
  *G02F 1/1339* (2006.01)
  *G09G 3/36* (2006.01)
  *G09G 5/373* (2006.01)
  *G09G 3/20* (2006.01)

(52) U.S. Cl.
  CPC ... *G02F 1/133308* (2013.01); *G02F 1/133526* (2013.01); *G02F 1/133603* (2013.01); *G02F 1/133606* (2013.01); *G09G 3/20* (2013.01); *G09G 3/3607* (2013.01); *G09G 5/373* (2013.01); *G02F 2001/133331* (2013.01); *G02F 2201/56* (2013.01); *G09G 2300/02* (2013.01); *G09G 2300/0426* (2013.01); *G09G 2300/0452* (2013.01)

(56) References Cited

U.S. PATENT DOCUMENTS

| | | | |
|---|---|---|---|
| 2009/0115933 A1 | 5/2009 | Mimura | |
| 2010/0214195 A1 | 8/2010 | Ogasawara et al. | |
| 2011/0109535 A1 | 5/2011 | Watanabe et al. | |
| 2011/0242686 A1 * | 10/2011 | Watanabe | G02B 17/0884 359/804 |
| 2011/0285934 A1 | 11/2011 | Watanabe | |
| 2012/0049718 A1 | 3/2012 | Watanabe et al. | |
| 2012/0069273 A1 * | 3/2012 | Watanabe | G02B 5/0215 349/64 |
| 2013/0242230 A1 * | 9/2013 | Watanabe | G02F 1/133504 349/64 |
| 2015/0138484 A1 * | 5/2015 | Watanabe | G02F 1/133308 349/58 |
| 2015/0179139 A1 * | 6/2015 | Watanabe | G09F 9/33 345/592 |

FOREIGN PATENT DOCUMENTS

| | | | | |
|---|---|---|---|---|
| JP | 2004-524551 A | 8/2004 | | |
| JP | 2005-293063 A | 10/2005 | | |
| JP | WO 2010070871 A1 * | 6/2010 | ......... | G02B 17/0884 |
| WO | 2007/132574 A1 | 11/2007 | | |
| WO | 2009/057342 A1 | 5/2009 | | |
| WO | 2009/157150 A1 | 12/2009 | | |
| WO | 2010/070871 A1 | 6/2010 | | |
| WO | 2010/089998 A1 | 8/2010 | | |
| WO | 2010/122781 A1 | 10/2010 | | |

* cited by examiner (a)

(b)

(c)

DISPLAY DEVICE

TECHNICAL FIELD

The present invention relates to a display device and more particularly relates to a display device with a light-transmitting cover.

BACKGROUND ART

A transmissive liquid crystal display device generally includes a liquid crystal display panel, a backlight unit, circuits and power supplies for supplying various kinds of electrical signals to the liquid crystal display panel, and a housing to house all of these components. The light emitted from the backlight unit is modulated on a pixel-by-pixel basis by the liquid crystal display panel, thereby conducting a display operation.

The liquid crystal display panel includes a display area (active area) in which a plurality of pixels are arranged and a frame area which surrounds the display area. In the display area, pixel electrodes, TFTs and other members are arranged and an image or video is displayed. In the frame area, on the other hand, arranged are a seal member to seal a liquid crystal material between the substrates, wiring connected to scan lines and signal lines, and terminals to be connected to an external driver circuit. In addition, to prevent the display quality from being debased on the periphery of the display area, an opaque member is sometimes provided in the frame area.

The frame area of the liquid crystal display panel is an area that does not contribute to a display operation, and therefore, decreases the planar area of the display area on the display screen of the panel. Also, in an arrangement in which a number of display devices are assembled densely together with no gaps left between them to form a single big screen (and which is sometimes called a "multi-display system"), the frame area is sensed to the viewer's eyes as a non-display area (black frame) representing the seams of the display device. Although the frame area has been narrowed year after year, it is difficult in principle to eliminate the frame area altogether.

Methods for making those seams less sensible to the eye in display devices which form a multi-display system have been studied in the related art. For example, Patent Documents Nos. 1 and 2 disclose a technique for making the seams less sensible to the eye by providing a light-transmitting cover for each display panel so that the cover is located closer to the viewer than the display panel is.

The end portion of the light-transmitting cover disclosed in Patent Documents Nos. 1 and 2 includes a curved portion which functions as a lens. That curved portion (lens portion) of the light-transmitting cover is typically arranged to cover not only the frame area of the display panel but also a part of the display area near the frame area (which will be sometimes hereinafter referred to as a "peripheral display area"). Part of the light that has gone out of pixels that are arranged in the peripheral display area is refracted by the lens portion, and an enlarged image is also displayed in front of the frame area. As a result, it looks to the viewer's eye as if an image was being displayed on the frame area, too, thus providing an image, of which the seams are less sensible to the viewer's eye.

On top of that, not just display devices for use to make up a multi-display system but also a display device to be used by itself may be provided with such a light-transmitting cover with a lens. Even so, the frame can also be made less sensible to the viewer's eyes.

CITATION LIST

Patent Literature

Patent Document No. 1: PCT International Application Japanese National-Phase Publication No. 2004-524551 (corresponding to U.S. Pat. No. 6,927,908)
Patent Document No. 2: U.S. Pat. No. 7,443,463
Patent Document No. 3: PCT International Application Publication No. 2010/070871

SUMMARY OF INVENTION

Technical Problem

However, when provided with such a light-transmitting cover, the display device comes to have its weight or thickness increased by that of the light-transmitting cover, which is a problem. For example, if the light-transmitting cover is too heavy, the light-transmitting cover could peel off due to its own heavy weight in a display device with a big display screen for use as a TV monitor or digital signage. Meanwhile, in a display device to be built in a mobile electronic device such as a smartphone, reduction in the thickness of the electronic device is interfered with by the thickness of the light-transmitting cover. Thus, there is a growing demand for methods for reducing the weight or thickness of the light-transmitting cover as much as possible.

The present inventors perfected our invention in order to overcome such a problem by providing a display device which is designed to include a thinner light-transmitting cover and of which the frame is not easily sensible to the viewer's eye.

Solution to Problem

A display device according to an embodiment of the present invention includes: a display panel having a display area and a frame area which is provided outside of the display area; and a light-transmitting cover which is arranged closer to a viewer than the display panel is and which includes lens portions that are arranged at positions corresponding to the boundary between the display area and frame area of the display panel. The display panel has a planar shape which includes four sides that define upper, lower, right and left sides, respectively, and four corner portions, each connecting two associated adjacent ones of the four sides together. The display panel further has a chamfered portion with a curved or straight edge which is arranged in at least one of the four corner portions inside of the intersection between extended lines of the two adjacent sides. The lens portions of the light-transmitting cover include a lens portion, of which the planar shape matches the chamfered portion of the display panel, at a position corresponding to the corner portion of the display panel.

In one embodiment, the display panel includes: a substrate; a display medium layer arranged on the substrate; and a band-shaped seal member which is arranged on the substrate and inside the frame area so as to surround the display medium layer. The seal member runs along the edge of the chamfered portion at the corner portion of the display panel.

In one embodiment, a plurality of pixels are arranged inside the display area, an outer edge of the display area is defined by some of the plurality of pixels that are located in the outermost part of the display area, and the outer edge of the display area has been formed in a shape corresponding to that of the chamfered portion.

In one embodiment, the outer edge of the display area has been formed to make multiple steps at the corner portion of the display panel.

In one embodiment, if the maximum distance from the outer edge of the display area to an end face of the display panel is a, the thickest part of the lens portions of the light-transmitting cover has a thickness falling within the range of 2.7 a to 4.6 a.

In one embodiment, the chamfered portion has a circular arc planar shape defined by a radius of curvature b which falls within the range of 1.6 a to 4.6 a.

In one embodiment, the light-transmitting cover has the lens portions at respective positions corresponding to all of the four sides and four corner portions of the display panel.

In one embodiment, the light-transmitting cover has the lens portions at respective positions corresponding to three out of the four sides of the display panel but has no lens portion at a position corresponding to the other side.

In one embodiment, the display device further includes an image processing section which transforms image data to be input to each of the plurality of pixels into a different type of image data, and the image processing section performs data transformation processing so that at least part of image data to be displayed at the corner portions is displayed in an inner area of the panel.

In one embodiment, the data transformation processing includes processing of resizing the image data.

In one embodiment, some of the plurality of pixels are associated with multiple different colors, and among the pixels that form the outer edge of the display area at the corner portion, pixels which are located at outermost ends in either a row direction or a column direction represent the same color.

In one embodiment, at the corner portion of the display panel, an outer edge of the frame area is defined by the chamfered portion of the display panel.

Advantageous Effects of Invention

A display device according to an embodiment of the present invention can make the frame area hardly sensible using a thinner light-transmitting cover.

DESCRIPTION OF EMBODIMENTS

First of all, it will be described what a general idea of a display device according to an embodiment of the present invention is.

The present inventors disclose, in Patent Document No. 3, a configuration in which a light-transmitting cover including lens portions on its periphery is provided for each of multiple display devices that form a multi-display system. That light-transmitting cover includes columnar lens portions which are arranged to run along the four sides of a display panel (and which will be hereinafter referred to as "side lens portions") and lens portions which are arranged at positions corresponding to the corner portions of the display panel and each of which suitably forms part of a solid of revolution (and which will be hereinafter referred to as "corner lens portions"). By providing such lens portions appropriately at those corner portions, too, an enlarged image can be displayed in not only horizontally and vertically on the panel but also obliquely across the panel as well.

However, the display panel disclosed in Patent Document No. 3 has a rectangular planar shape and each corner portion of the panel forms a substantially right angle. If a display panel is formed in a rectangular shape, gaps are not created easily between display devices that are tiled together, which is certainly beneficial. In that case, however, the width of the frame area RF (i.e., the area outside of the display area RA) becomes broader at the corner portions of the display panel 10 than along the four sides of the panel as in the comparative example shown in FIG. 1(a). For example, if the width of the frame area RF along the upper side of the panel is a1 and the width of the frame area RF along the left side of the panel is a2, the width of the frame area RF at the upper left corner portion of the panel becomes $(a1^2+a2^2)^{1/2}$.

Figure 3:
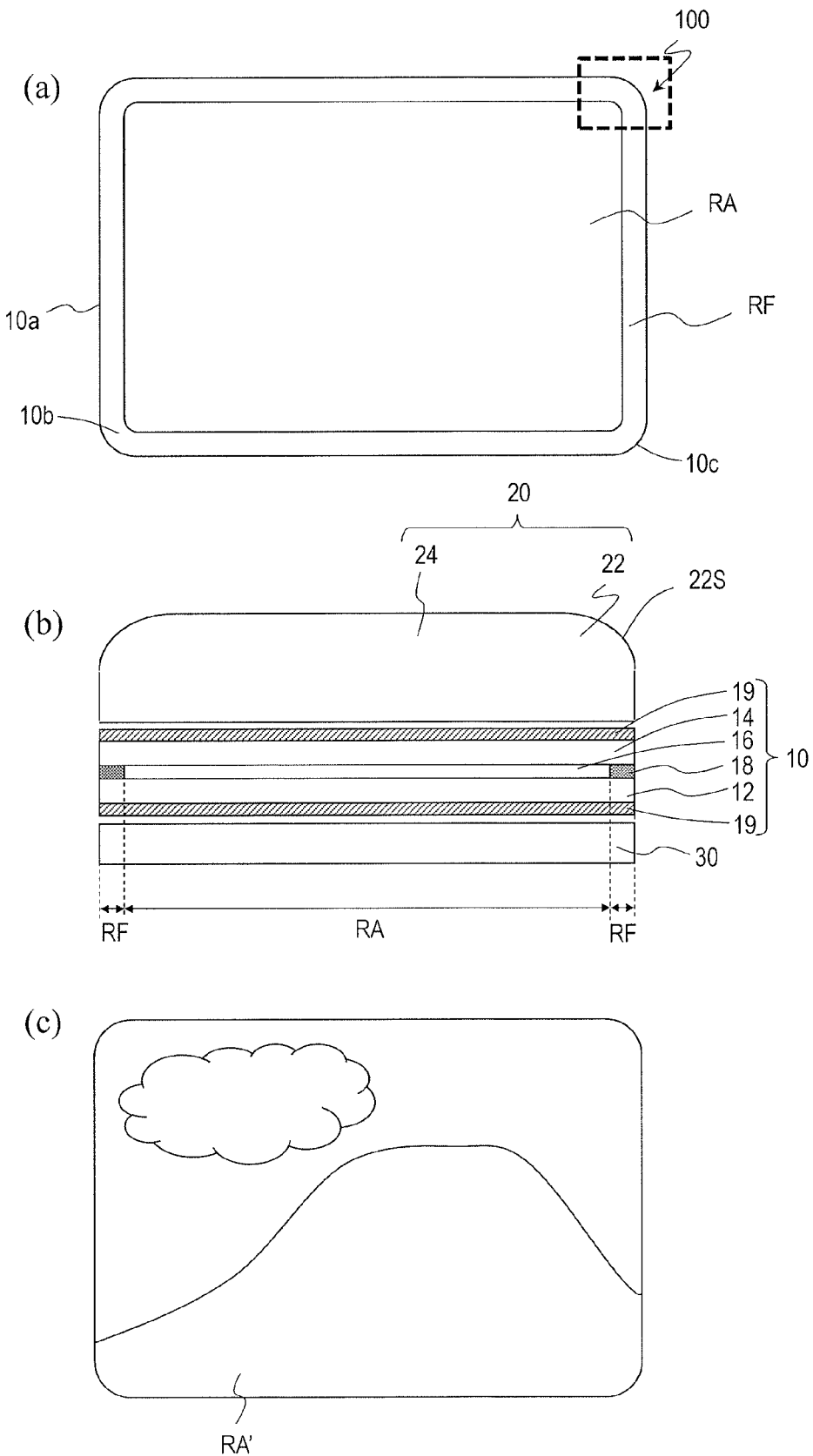
FIG. 3 Illustrates a configuration for a display device according to a first embodiment of the present invention, wherein (a) is a plan view thereof, (b) is a cross-sectional view thereof, and (c) is a plan view illustrating an image that can be seen through the light-transmitting cover.

The present inventors discovered via experiments that the thickness of the light-transmitting cover 20 (see FIG. 3(b)) should be set based on the maximum width of the frame area RF on which an enlarged image would be displayed. More specifically, if the light-transmitting cover 20 is made of an ordinary resin material such as an acrylic resin (with a refractive index of about 1.5), the thickness of the light-transmitting cover 20 is suitably set to be about 2.7 to about 4.6 times as large as the maximum frame width. This is one of the conditions for making the frame area hardly sensible which were discovered by the present inventors.

Figure 1:
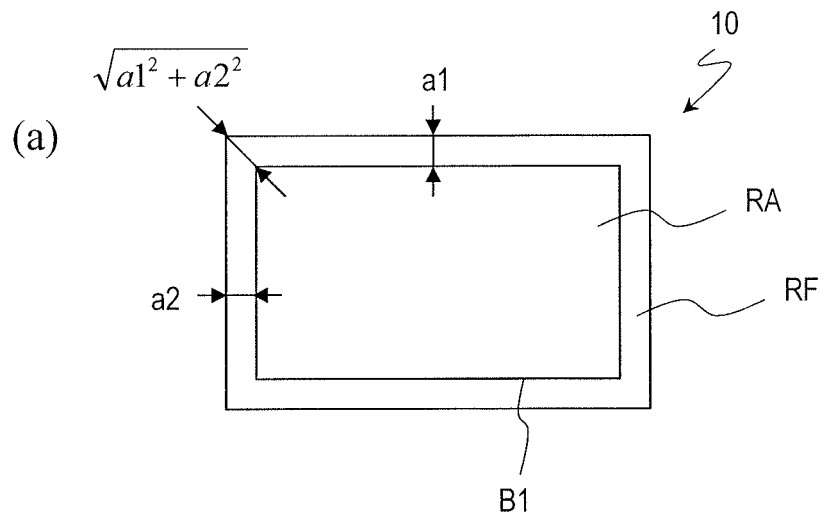
FIG. 1 Illustrates a general idea of a display device according to an embodiment of the present invention, wherein (a) is a plan view illustrating a display device as a comparative example and (b) is a plan view illustrating a display device as an example of the present invention.
Figure 1:
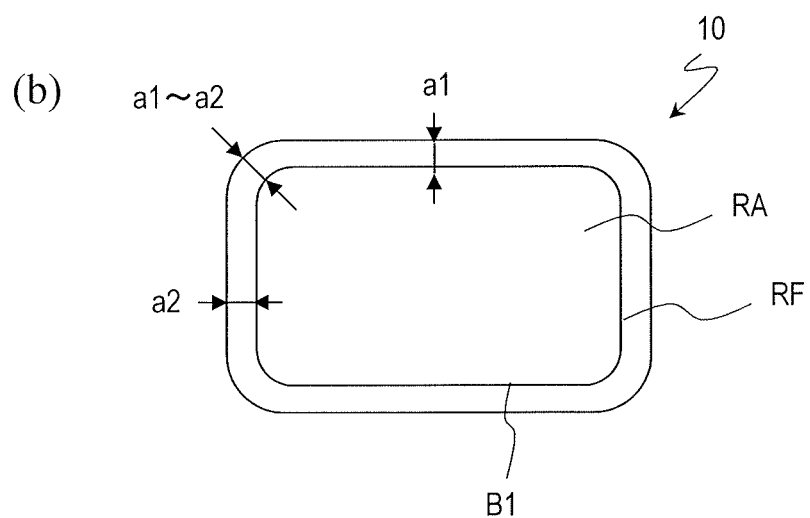

That is why to make the frame area RF hardly sensible at the corner portions of the panel, too, in the display panel of the comparative example shown in FIG. 1(a), the thickness of the light-transmitting cover is determined based on the width $(a1^2+a2^2)^{1/2}$ of the frame area RF at the corner portions. That is to say, if the frame should be made hardly visible only along the sides with the frame at the corner portions ignored, the thickness of the light-transmitting cover may be simply set to be about 2.7 to about 4.6 times as large as the greater one of the widths a1 and a2. However, if the frame area should be hidden at the corner portions, too, the thickness of the light-transmitting cover is set to be 2.7 to 4.6 times as large as the maximum frame width $(a1^2+a2^2)^{1/2}$. In that case, the light-transmitting cover could be too thick to avoid increasing the weight or the sense of depth excessively.

On the other hand, as shown in FIG. 1(b), a display device according to an embodiment of the present invention has chamfered portions 10C (e.g., rounded corner portions 10C in the example illustrated in FIG. 1(b)) at the corner portions of the display panel 10. The rounded corner portions 10C are obtained by cutting the corner portions of the display panel 10 in a curved shape. However, the corner portions do not have to be cut in a curved shape but may also be cut in a straight shape. In this description, a curved or straight portion which is arranged at a corner portion of the display panel inside of the intersection C1 (i.e., closer to the panel) between extended lines of the two sides to be connected together will be sometimes hereinafter referred to as a "chamfered portion".

In this description, the chamfered portion refers herein to a portion which connects two sides together with a line or curve which is longer than the width a1 or a2 of the frame area RF (typically, twice or more as long as the width a1 or a2 of the frame area RF). As can be seen, the chamfered portion has some size, and a corner portion which is slightly rounded (or cut off) to avoid chipping or cracking is not regarded as the chamfered portion.

By providing the chamfered portions 10C, the width of the frame area at the corner portions can be approximately as broad as the width a1, a2 of the frame area along the sides. However, as can be seen from FIG. 1(b), to set the frame area width at the corner portions as described above, the boundary B1 between the frame area RF and the display area RA is also suitably formed in the same shape as the chamfered portions 10C.

Figure 2:
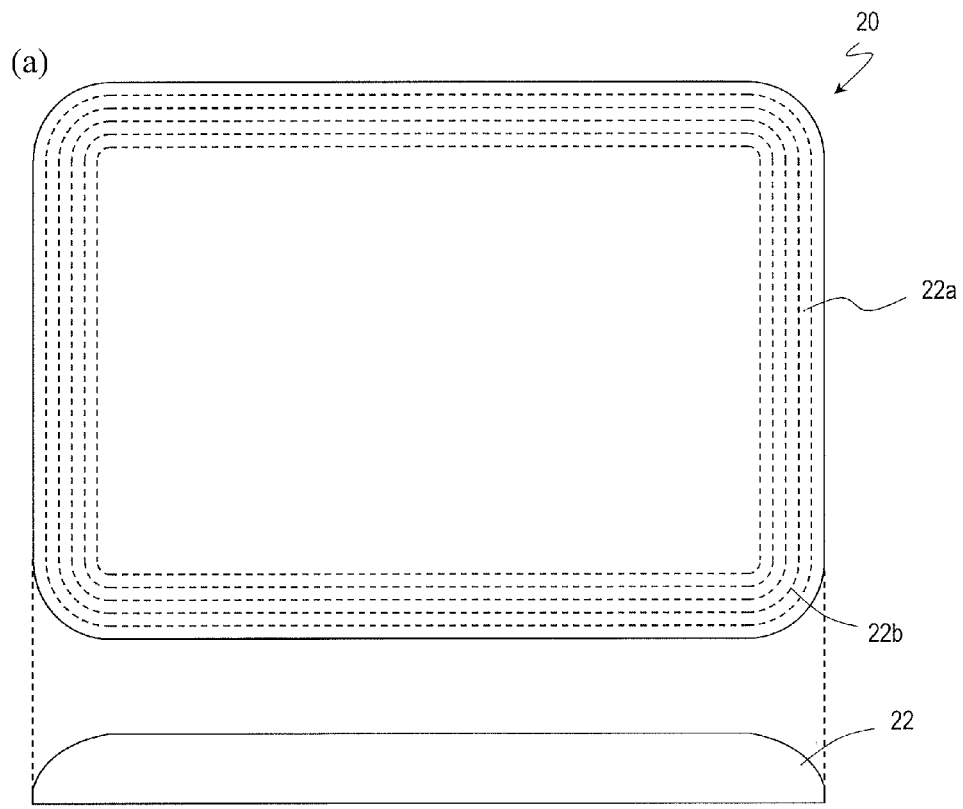
FIG. 2 Illustrates a light-transmitting cover provided for a display device according to an embodiment of the present invention, wherein (a) is a plan view and cross-sectional view thereof and (b) is a perspective view thereof.
Figure 2:
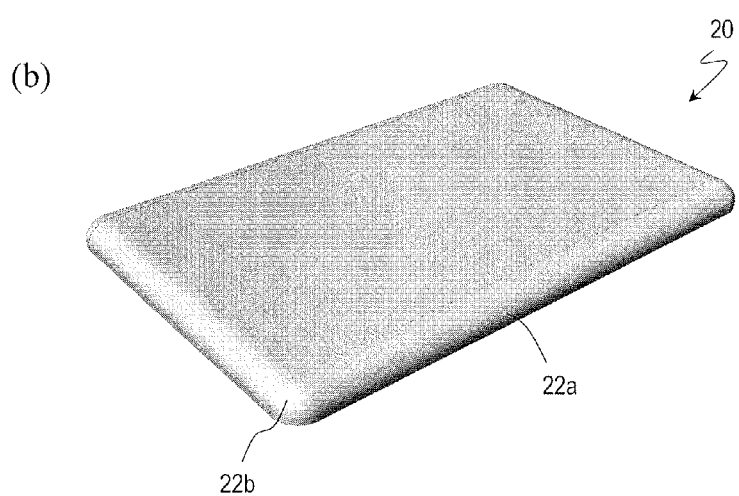

Furthermore, the corner portions of the light-transmitting cover 20 also suitably have the same shape as the chamfered portions 10C of the display panel 10. FIGS. 2(a) and 2(b) illustrate a light-transmitting cover 20 according to an embodiment of the present invention. At the end portions of the light-transmitting cover 20, arranged are side lens portions 22a corresponding to the four sides of the display panel 10 and corner lens portions 22b corresponding to the corner portions of the display panel 10. These two groups of lens portions 22a and 22b will be hereinafter collectively referred to as "lens portions 22".

The corner lens portions 22b have a profile corresponding to that of the chamfered portions 10C of the display panel. In FIG. 2(a), the flexure of the surface (i.e., the viewer-side surface) of the lens portions 22 is indicated by dotted contour lines. In the example illustrated in FIG. 2(a), the contour lines are drawn at regular intervals for the sake of simplicity. However, this is only an example. Typically, the interval between the contour lines is relatively narrow in the outer part of the lens portions 22 (i.e., closer to the edges) and is relatively broad in the inner part of the lens portions (i.e., closer to the center of the panel). A preferred shape of the viewer-side surface of the lens portions 22 will be described in detail later.

Next, it will be described specifically how much the thickness of the light-transmitting cover 20 can be reduced by providing the chamfered portions 10C. In the comparative example illustrated in FIG. 1(a), if the frame width is supposed to be a (=a1=a2) both laterally and vertically, the frame width at the corner portions will be $(2a^2)^{1/2}$=about 1.41a. That is to say, compared to the example of the present invention shown in FIG. 1(b), the frame width increases about 1.41 times. In that case, the thickness d of the light-transmitting cover is set to be as follows:

Comparative example (shown in FIG. 1(a)): d=2.7×1.41 a to 4.6×1.41 a

Example of the present invention (shown in FIG. 1(b)): d=2.7×a to 4.6×a

Comparing these thicknesses d to each other, it can be seen that the thickness of the light-transmitting cover can be reduced 1/1.41 times in the example of the present invention compared to the comparative example. Also, if the lateral frame width is a1, the vertical frame width is a2, and a1 and a2 are not significantly different from each other (but a1>a2), the thickness of the light-transmitting cover can be reduced approximately $a1/(a1^2+a2^2)^{1/2}$ times.

As can be seen from the foregoing description, a display device according to an embodiment of the present invention can let display light that has been come from the display panel go through the lens portions in the peripheral area (including the corner portions) of the display device, and can display an enlarged image even on the frame area of the panel with the thickness and weight of the light-transmitting cover reduced. As a result, a TV monitor or information display which hardly allows the viewer to sense the frame along the four sides and four corners thereof can be provided. Consequently, a display with outstanding presence to merge with the surrounding environment smoothly is realized. In addition, by presenting an image harmonized with the surrounding environment, the display devices can be used as a sort of optical camouflage almost without allowing the viewer to sense the presence of the display. A display device according to an embodiment of the present invention can create such a totally new viewing experience.

It should be noted that if the display panel 10 and light-transmitting cover 20 have the chamfered portions 10C, then gaps will be created at the corner portions (seams) of display devices when a plurality of display devices are vertically and laterally tiled together to form a multi-display system. That is why a display device according to an embodiment of the present invention is suitably used by itself.

Embodiments of the present invention will now be described with reference to the accompanying drawings. It should be noted, however, that the present invention is in no way limited to the embodiments to be described below.

Embodiment 1

A stationary (fixed) display device of a relatively large size for use as a TV monitor or digital signage, for example, will be described as a display device as a first embodiment.

FIGS. 3(a) and 3(b) are respectively a plan view and a cross-sectional view of a display device 100 according to this first embodiment. FIG. 3(c) illustrates an image which the viewer can view through the light-transmitting cover 20 (i.e., illustrates an on-cover display area RA'). As shown in FIG. 3(c), the image is displayed on the frame area RF of the display panel 10, too.

As shown in FIG. 3(b), this display device 100 is comprised of a display panel 10, a light-transmitting cover 20 which is arranged closer to the viewer than the display panel 10 is, and a backlight 30 which is arranged behind the display panel 10. The display panel 10 and backlight 30 are housed in a housing (not shown). The housing may have a housing portion which covers the side surface of the display panel 10. However, the housing portion is suitably provided so as to be hardly visible to the viewer. The back surface of the light-transmitting cover 20 may be bonded to the front surface of the display panel 10 with an adhesive, for example, or may be secured onto the housing portion that is arranged beside the panel's side surface.

In this embodiment, the display panel 10 is a liquid crystal panel and has a configuration in which a liquid crystal layer 16 is interposed as a display medium layer between a TFT substrate 12 and a counter substrate 14. The TFT substrate 12 and counter substrate 14 are bonded together with a seal member 18 which has been applied like a frame (or band) onto their peripheral area. The liquid crystal layer 16 is formed by injecting a liquid crystal material into the gap surrounded with the seal member 18 between the substrates. An optical film layer 19 such as a polarizer or a phase difference film is attached onto the outer surface of the TFT substrate 12 and counter substrate 14. Alternatively, the optical film layer 19 may be provided on the inner surface (i.e., the surface closer to the liquid crystal layer 16) of the TFT substrate 12 and counter substrate 14.

The light-transmitting cover 20 is comprised of a flat plate portion 24 which covers the display area almost entirely and lens portions 22 provided on the periphery of the flat plate portion 24. In this embodiment, the viewer side surface 22S of the lens portions 22 is a convex curved surface (lens surface). However, the lens portions 22 may also have any other shape. For example, their back surface (i.e., the surface opposite from the viewer-side surface) may also be a curved surface. The light-transmitting cover 20 is made of a transparent resin material (such as an acrylic resin, a polycarbonate resin, a styrene based resin or an olefin based resin), a silicone gel, or a light-transmitting material such as glass.

The backlight 30 may be an edge light type backlight including a light source such as an LED, a light guiding plate, and a diffuser or a direct type (surface emitting type). In addition, a circuit board to drive the display device 100 may be further arranged behind the backlight 30.

As shown in FIG. 3(a), in this liquid crystal display device 100, the display panel 10 has an almost (i.e., not completely) rectangular planar shape, and has the upper, lower, left and right sides 10a and four corner portions 10b, each of which connects an associated one of those four sides 10a to two adjacent ones of them. Also, at each of those corner portions 10b, provided is a chamfered portion 10C (e.g., a rounded corner portion 10C in this embodiment). That is to say, each corner portion 10b of the display panel 10 is formed so that its associated two sides do not cross each other at right angles.

In this manner, a display area RA and a frame area RF which is a non-display area that is provided outside of the display area RA are defined on a panel screen which has the shape of a rectangle with rounded corner portions. The display area RA is an area in which an image can be displayed on the panel screen of the display panel 10, while the frame area RF is an area in which an image cannot be displayed on the panel screen of the display panel 10.

Figure 4:
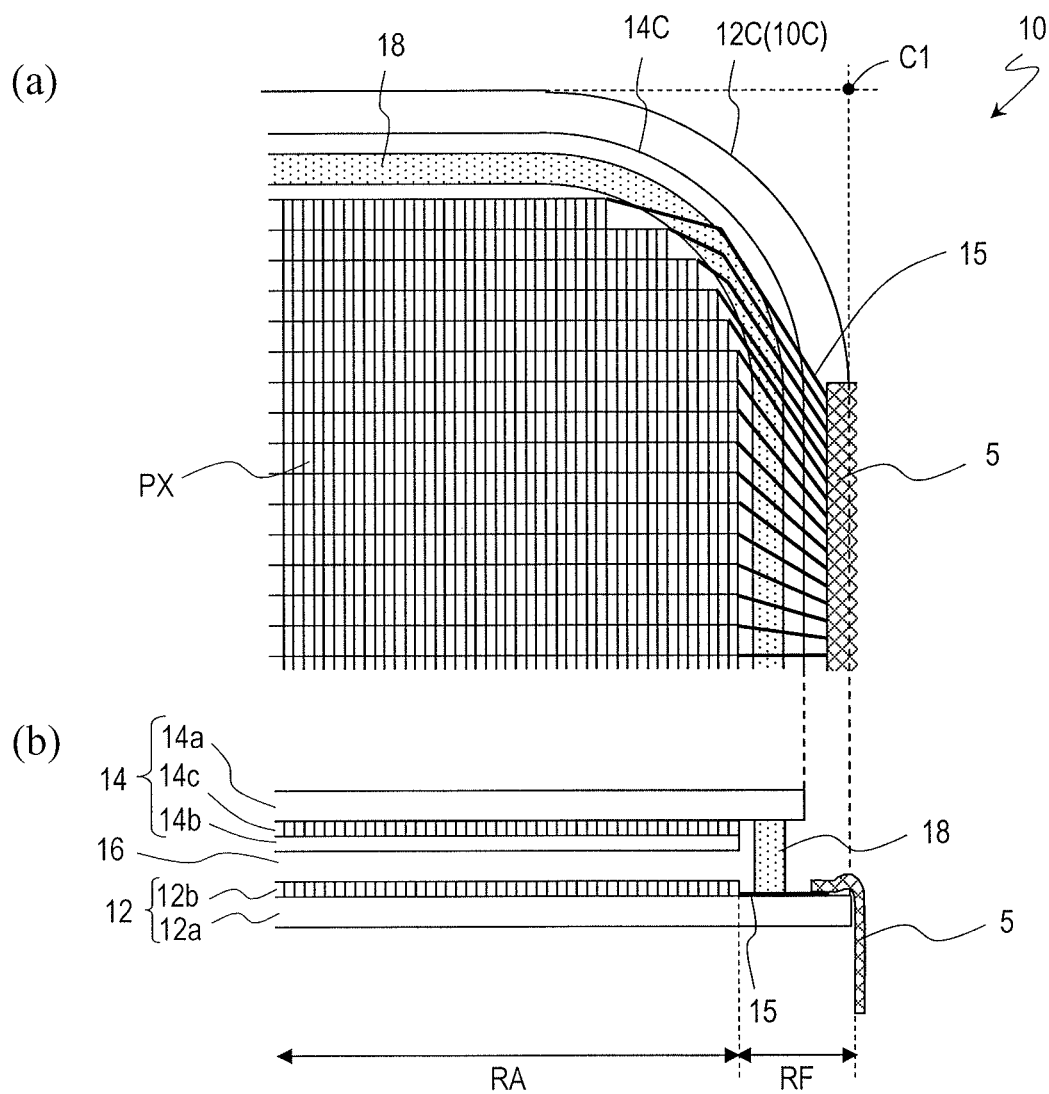
FIG. 4 Illustrates, on a larger scale, a corner portion of the display panel shown in FIG. 3(a) and its surrounding portions, wherein (a) and (b) are respectively a plan view and cross-sectional view thereof.

FIGS. 4(a) and 4(b) of illustrate, on a larger scale, a corner portion of the display panel 10 and its surrounding portions. As shown in FIG. 4(a), a plurality of pixels PX are arranged in columns and rows to form a matrix pattern in the display area RA. On the other hand, in the frame area RF, arranged are the seal member 18 and wiring 15. Also, in the frame area RF, the wiring 15 may be connected to an FPC (Flexible Printed Circuit board) 5, for example. Optionally, a TAB (Tape Carrier Package) or a COF (Chip On Film) may also be provided in the frame area RF. Furthermore, a driver IC chip may be mounted or a monolithic driver circuit may be formed there.

As shown in FIG. 4(b), the TFT substrate 12 of this embodiment includes a transparent substrate 12a and pixel electrodes 12b, TFTS (not shown) and other members which have been formed on the transparent substrate 12a. On the other hand, the counter substrate 14 includes a transparent substrate 14a and color filters 14c, a counter electrode 14b and other members which have been formed on the transparent substrate 14a. The respective transparent substrates 12a and 14a of the counter substrate 14 and TFT substrate 12 are generally made of light-transmitting glass. However, if the impact resistance or flexibility should be given a higher priority, the transparent substrates 12a and 14a may also be made of a resin material instead of glass. It should be noted that this configuration is only an example. And the display panel 10 may naturally have any other configuration depending on the display mode, for example.

As shown in FIG. 4(a), the corner portion of the TFT substrate 12 has been rounded (i.e., cut off into a curved shape), and a chamfered portion 12C with a circular arc edge has been formed. Meanwhile, its associated corner portion of the counter substrate 14 has also been rounded, and a chamfered portion 14C with a circular arc edge has been formed there. Also, the band-shaped seal member 18 is provided so as to draw a circular arc curve along the edges of the respective chamfered portions 12C and 14C of the TFT substrate 12 and counter substrate 14.

In the configuration of this embodiment, the outer edge of the frame area RF corresponds to the edge of the chamfered portions 12C of the TFT substrate 12. The reason is that the TFT substrate 12 is arranged to protrude outward from the counter substrate 14 and because wiring, terminals and other members that form the frame area RF are arranged in that protruding portion. That is why in this description, the "chamfered portions 10C of the display panel 10" refer herein to the chamfered portions 12C of the TFT substrate 12.

Also, the pixels PX are arranged inside of the seal member 18. At each corner portion, the outermost ones of the pixels PX are arranged along the seal member 18 (i.e., along the chamfered portions 12C and 14C of the TFT substrate 12 and counter substrate 14). In this description, the boundary which is formed by those outermost ones of the pixels that are arranged inside the display area RA to define the end of the pixel arranged area will be sometimes hereinafter referred to as "the outer edge of the display area".

A display panel 10 with such a configuration may be obtained by cutting off portions of the TFT substrate 12 and counter substrate 14 along the seal member 18 after the TFT substrate 12 and counter substrate 14 have been bonded together with the seal member 18, for example. The liquid crystal layer 16 interposed between the TFT substrate 12 and counter substrate 14 may be formed either by dripping a liquid crystal material onto one of the two substrates that have not yet been bonded together and then bonding the two substrates together or by bonding the two substrates together with an injection port cut through the seal member 18, injecting the liquid crystal material through the port, and then sealing the injection port.

Since the corner portions of the TFT substrate 12 have been cut off, the wiring 15 to be connected to the pixel electrodes 12b and TFTs (not shown) has been extended so as to be bent along the end portions of the TFT substrate 12. The wiring 15 that has been extended in such a bent shape is connected to the flexible printed circuit (FPC) board 5 at the end face of the substrate, and a signal is applied from an external driver circuit to the wiring 15.

Also, the outer edge of the frame area RF of the display panel 10 (i.e., the chamfered portions 12C of the TFT substrate 12 in this embodiment) suitably has a circular arc shape. With such circular arc chamfered portions 12C, if the lens portions 22b (corner lens portions) of the light-transmitting cover 20 form part of a solid of revolution, the axis of rotation of the solid of revolution can be defined at the center of curvature of the circular arc as will be described later. Unless the chamfered portions 12C have a circular arc shape, the axis of rotation of the solid of revolution is suitably defined at the center of curvature when the chamfered portions 12C are approximated to be a circular arc.

Figure 5:
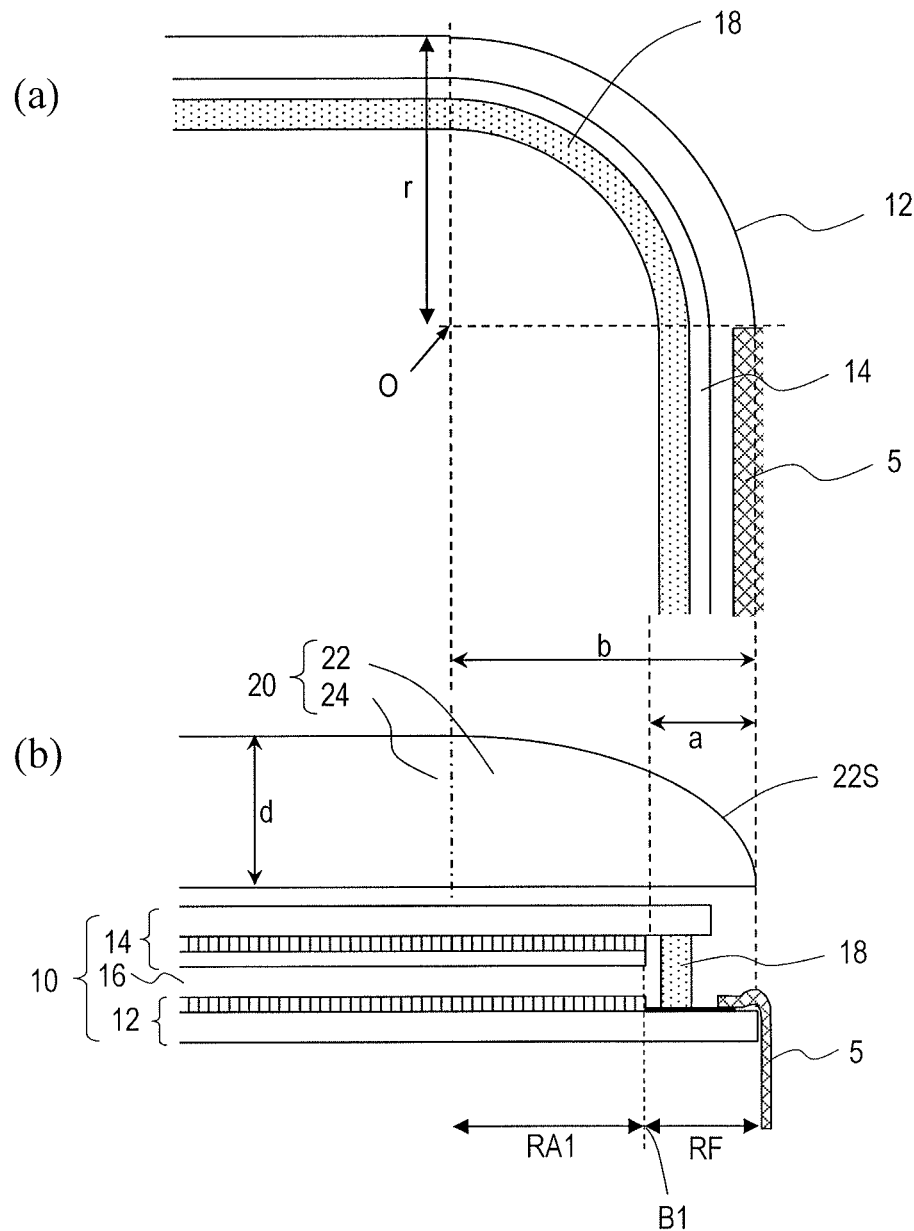
FIG. 5 Illustrates the relative arrangement of the display panel and light-transmitting cover in the vicinity of the corner portion of the display panel shown in FIG. 3(a), wherein (a) and (b) are respectively a plan view and cross-sectional view thereof.

FIGS. 5(a) and 5(b) of show the relative position of the light-transmitting cover 20 with respect to the display panel 10 at a corner portion of the display panel 10.

The lens portions 22 of the light-transmitting cover 20 are arranged so as to overlap with an area covering the frame area RF and the peripheral display area RA1 of the display panel 10. In other words, the lens portions 22 are arranged over the boundary B1 between the frame area RF and the peripheral display area RA1. In this case, the boundary B1 between the display area RA and the frame area RF has been defined to run along the respective sides of the display panel 10. At the corner portions of the display panel 10, the boundary B1 typically draws a substantially circular arc along the edge shape of the chamfered portions 10C.

On a plan view, the corner lens portions 22b (see FIG. 2) have a shape corresponding to that of the chamfered portions 10C of the display panel 10 (e.g., the chamfered portions 12C of the TFT substrate 12 in this embodiment). And each corner lens portion 22b forms part of a solid of revolution, of which the axis of rotation passes through the center of curvature O of the circular arc drawn by its associated chamfered portion 10C. In this description, the "solid of revolution" refers herein to a solid figure obtained by rotating a plane FIG. 360 degrees around a line which is drawn on the same plane as the plane figure.

More specifically, each corner lens portion 22b is a lens portion which is arranged over its associated chamfered portion 10C of the display panel 10 and covers the frame area RF and peripheral display area RA1 at the chamfered portion 10C. Also, the corner lens portion 22b has a solid shape which is defined by cutting off a solid of revolution, obtained around an axis of rotation that passes through the center of curvature of the chamfered portion 10C and that runs along a normal to the panel screen, along two planes including that axis of rotation.

In this case, supposing the frame width is a, the length measured from the panel's end face to the axis of rotation O is b, the maximum thickness of the light-transmitting cover 20 is d, and the radius of curvature of the circular arc is r as shown in FIGS. 5(a) and 5(b), the relation represented by the following equations is suitably satisfied to display an image appropriately on the frame area even at the corner portions. This condition was discovered by the present inventors via experiments.

$d = 2.7\text{ a to }4.6\text{ a}$ $r = b = 1.6\text{ a to }4.2\text{ a}$

However, even if these parameters fall out of these ranges, the effect of making the frame hardly visible can also be achieved. That is why if it is no problem even when the frame is visible to a certain degree, the parameters may fall out of these ranges.

The shape of the lens surface 22S of the lens portions 22 will be described below. For example, in their side lens portions 22b, the shape of the lens surface 22S may form part of a circular cylindrical side surface. In the corner lens portions 22a, on the other hand, the shape of the lens surface 22S may form part of a spherical surface. In that case, on a cross section which intersects at right angles with the boundary between the frame area and the display area, the lens surface 22S defines a circular arc. However, the lens surface 22S does not have to have such a shape but may also define a curve represented by an aspheric equation on the cross section described above.

The aspheric equation defining the lens surface 22S may be the following equation which uses the radius of curvature R1 (or curvature c) and an aspheric coefficient (Conic constant) k:

Aspheric Equation: $f(x) = Y - cx^2/(1 + (1-(1+k)c^2x^2)^{1/2})$ where c=1/R1, x is the horizontal distance from the top of the lens (i.e., from the boundary between the lens portions 22 and the flat plate portion 24) and Y is the height at the top of the lens (i.e., the thickness of the light-transmitting cover in the flat plate portion 24). The radius of curvature R1 and Conic constant k are set appropriately according to the width of the frame area RF.

The shape of the lens surface 22S is described in detail in PCT International Application Publication No. 2009/157150 and Patent Document No. 3, the entire disclosures of which are hereby incorporated by reference. Any of the lens surface shapes disclosed in these documents may also be adopted in the embodiments of the present invention.

Figure 6:
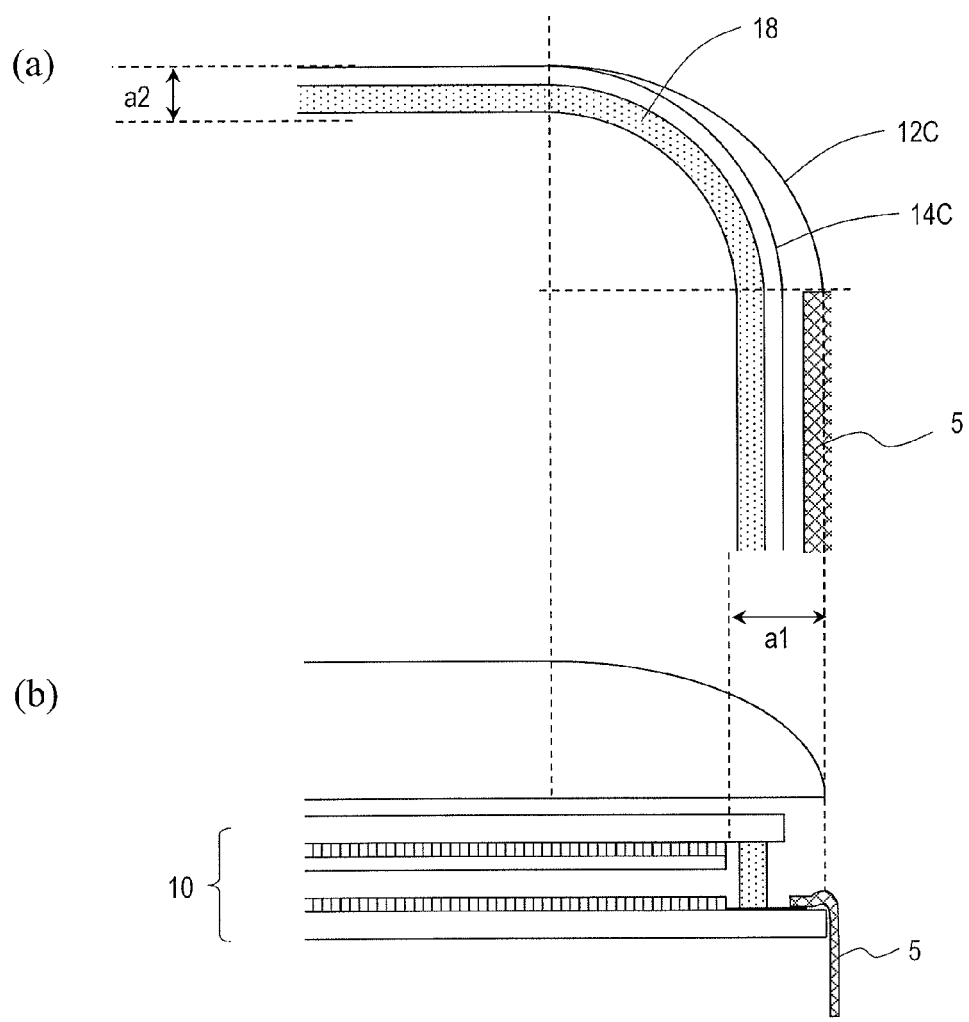
FIG. 6 Illustrates, on a larger scale, a corner portion of a display device as a modified example and its surrounding portions, wherein (a) and (b) are respectively a plan view and cross-sectional view thereof.

Next, it will be described with reference to FIGS. 6(a) and 6(b) what if the frame area RF has mutually different widths on two adjacent sides. If there is no need to mount the FPC 5 on one side, for example, the frame width may vary from one side to another. For instance, as shown in FIG. 6(a), the frame width a1 on the panel's right side which is connected to the FPC 5 may be relatively broad but the frame width a2 on the panel's upper side may be relatively narrow (i.e., a1>a2 may be satisfied).

In that case, the chamfered portion 12C of the TFT substrate 12 cannot draw a perfectly circular arc at such a corner portion. However, if the chamfered portion 12C is shaped to form part of an ellipse, for example, and if the corner lens portion is defined to form part of a spheroid, then an enlarged image can be displayed on the frame area. Nevertheless, if the chamfered portion 12C is formed as a part of an ellipse, the image will be enlarged non-uniformly and will be deformed more significantly. For that reason, the chamfered portion 12C is suitably as close to a circular arc as possible.

Next, a modified example of the display device will be described with reference to FIGS. 7(a) to 7(c) and FIGS. 8(a) to 8(c).

Figure 7:
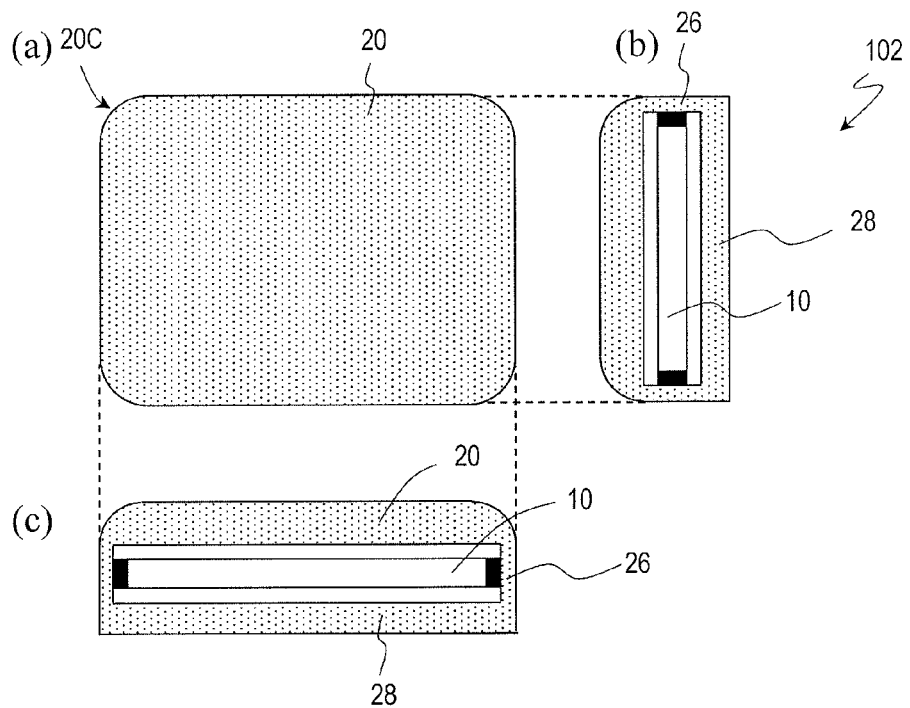
FIG. 7 Illustrates a display device as another modified example, wherein (a), (b) and (c) are respectively a plan view, vertical cross-sectional view and horizontal cross-sectional view thereof.

In the display device 102 shown in FIGS. 7(a) to 7(c), a light-transmitting cover 20 which covers the viewer-side surface of the display panel 10, a housing portion which covers the side surface of the display panel 10 (which will be hereinafter referred to as a "lateral housing portion 26") and a housing portion which covers the bottom of the display panel 10 (which will be hereinafter referred to as a "bottom housing portion 28") are integrated together. In such a configuration, the lateral and bottom housing portions 26 and 28, as well as the light-transmitting cover, are made of a material with a light-transmitting property.

By providing the lateral housing portion 26 on the side surface of the display panel 10, it is possible to prevent dust or water from entering the panel and to increase its impact resistance. Such a configuration in housing portions integrated with a light-transmitting cover are provided on the side surface and bottom of a display panel is disclosed in PCT International Application Publication No. 2010/089998. However, in the display device disclosed in PCT International Application Publication No. 2010/089998, no chamfered portions are provided at any corner portion of the display panel unlike embodiments of the present invention. In addition, the corner portions of the light-transmitting cover do not have a shape corresponding to that of the chamfered portions of the display panel.

In this display device 102, chamfered portions (not shown) are provided at the corner portions of the display panel 10, and chamfered portions 20C in the shape corresponding to that of the chamfered portions of the display panel 10 have also been formed at the corner portions of the light-transmitting cover 20. In this modified example, however, the edges of these two sets of chamfered portions do not overlap with each other when viewed along a normal to the panel. Typically, the circles defining the circular arcs of each pair of these chamfered portions are concentric ones with two different radii.

Figure 8:
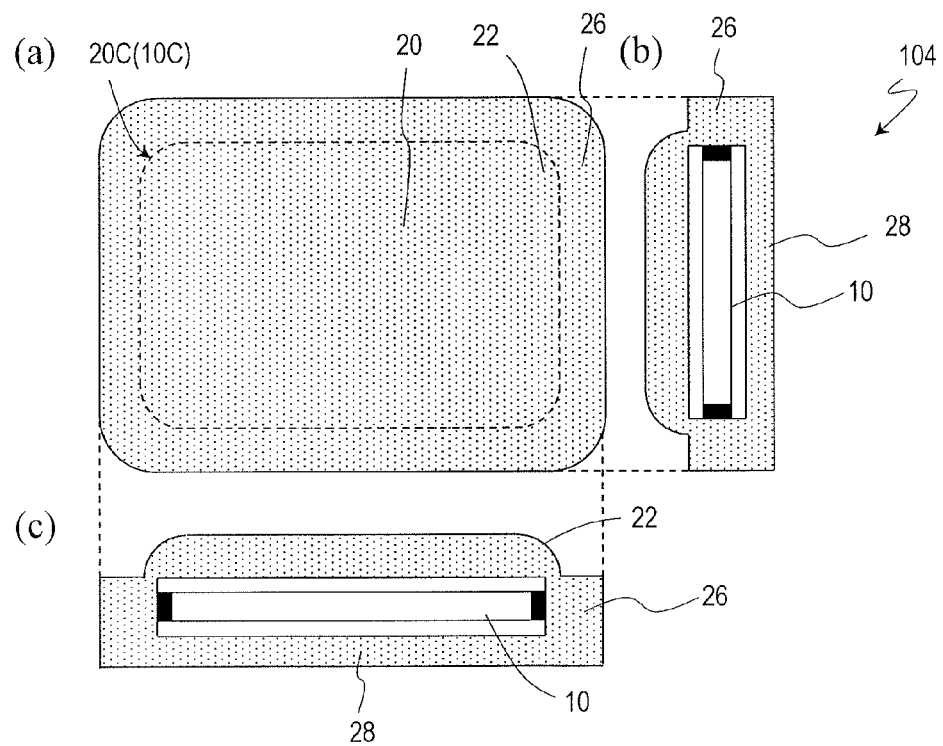
FIG. 8 Illustrates a display device as still another modified example, wherein (a), (b) and (c) are respectively a plan view, vertical cross-sectional view and horizontal cross-sectional view thereof.

FIGS. 8(a) to 8(c) illustrate another modified example. In this modified example, the lateral housing portion 26 protrudes outward beyond the edges of the lens portions 22. By making the lateral housing portion 26 protrude significantly outward in this manner, the impact resistance can be increased. Since no lens portions 22 are provided on the viewer-side surface of the lateral housing portion 26, an image is not displayed there by the display panel 10. However, since the lateral housing portion 26 has a light-transmitting property, the viewer can see the background of the display device. That is why even with such a configuration adopted, an image can also be presented to the viewer as if there were no frames.

In the display device of the first embodiment described above, the display panel 10 has chamfered portions 10C, and therefore, the frame area RF can be provided so as to run along the chamfered portions 10C while maintaining a substantially constant width. As a result, an enlarged image can be displayed appropriately even at corner portions with the thickness of the light-transmitting cover 20 reduced, and an image can be presented to the viewer so that the frame is hardly visible to him or her.

Embodiment 2

A portable display device for use as a mobile electronic device such as a smartphone or tablet PC will be described as a display device 200 according to a second embodiment. In this description, any electronic device with a display panel in general, such as a smartphone or a tablet PC, will be hereinafter referred to as a "display device".

FIGS. 9(a) to 9(c) illustrate a display device (e.g., a smartphone) 200 according to this second embodiment. This display device 200 includes a display panel 10, a backlight 30 arranged behind the display panel 10, and a driver circuit and battery arranged behind the backlight 30 (which will be hereinafter referred to as a "battery section 40" collectively). The display device 200 may further include a touchscreen panel (not shown), which may be arranged either over or inside the display panel 10. These members are housed inside a housing 29 including a lateral housing portion 26 which covers the side surface of the display panel 10.

As in the first embodiment described above, a light-transmitting cover 20 including lens portions 22 at its end portions is arranged in front of the display panel 10. In FIGS. 9(a) to 9(c), the light-transmitting cover 20 is illustrated as being integrated with the housing 29. However, the light-transmitting cover 20 and the housing 29 may be formed separately from each other. The display panel 10 and light-transmitting cover 20 may have the same configuration as their counterparts of the first embodiment, and description thereof will be omitted herein.

In the smartphone 200, generally there are manipulating buttons 42 and a microphone part for talking (not shown) on the frame 44 under the screen. In this case, there is little meaning to display an enlarged image on the frame 44 under the screen. That is why in this embodiment, the light-transmitting cover 20 is provided with lens portions 22 to display an enlarged image on the frame area RF on only three sides (e.g., the upper, right and left sides) of the display panel 10. Naturally, if the manipulating buttons 42 are unnecessary, the frame area may be narrow on all of the four sides and the lens portions may be provided on all four sides of the frame.

In addition, chamfered portions 10C are provided at two corner portions (i.e., at a corner portion where the upper and right sides of the display panel 10 are connected together and at a corner portion where the upper and left sides of the display panel 10 are connected together), and an enlarged image can be displayed to the edges of the display device 200 through the lens portions 22 (corner lens portions) of the light-transmitting cover 20 arranged over the display panel 10.

Figure 9:
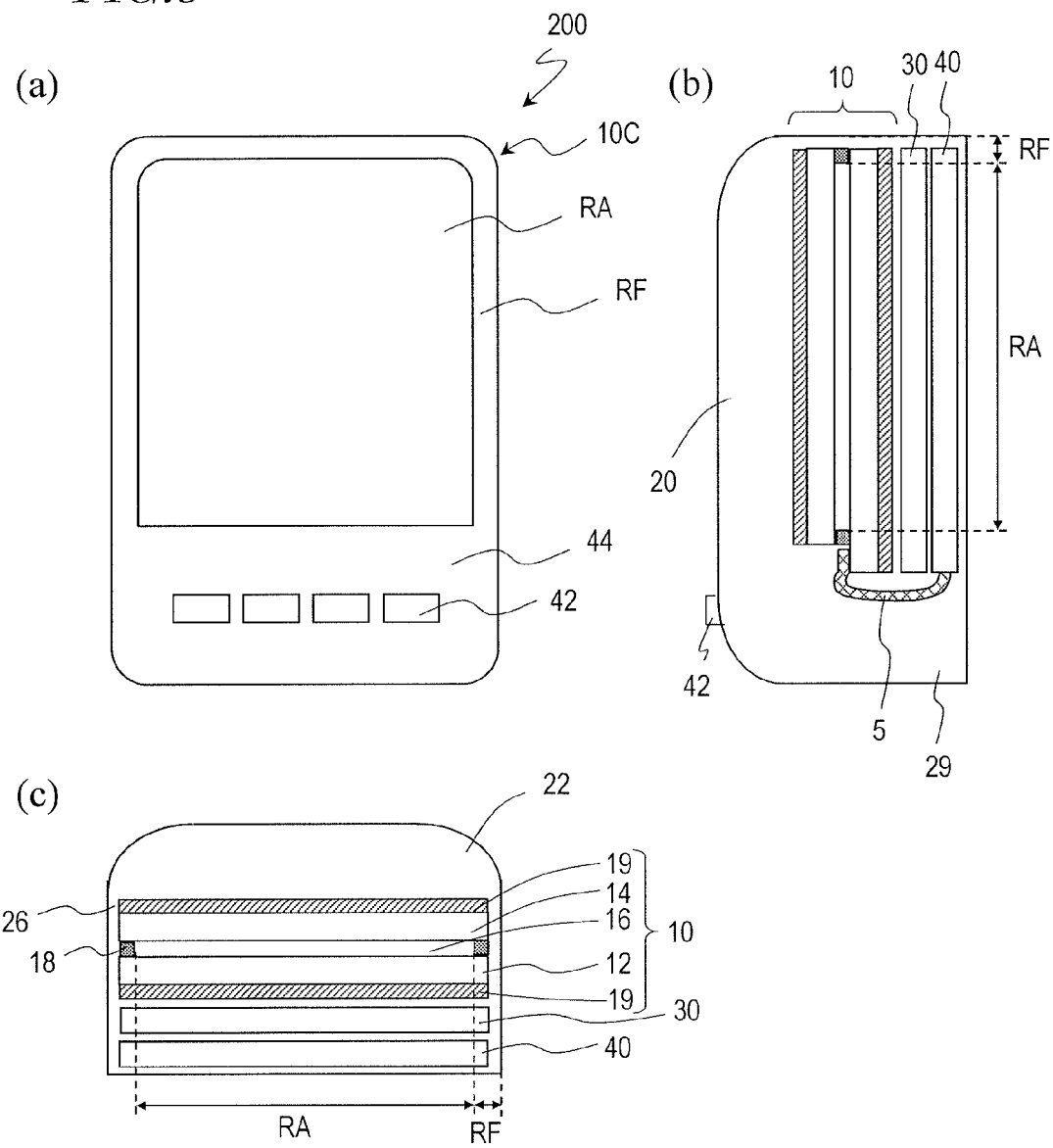
FIG. 9 Illustrates a configuration for a display device according to a second embodiment, wherein (a), (b) and (c) are respectively a plan view, vertical cross-sectional view and horizontal cross-sectional view thereof.

Also, when required by consideration of design, for example, the lower left and lower right corner portions of the display device 200 may also be rounded as shown in FIG. 9. Furthermore, along the edge of the lower side of the light-transmitting cover 20 (i.e., along the edge of the lower side of the display device 200), the viewer-side surface may include a portion with a curved surface. That curved portion typically has the same curved shape as the lens portions provided along the other sides. If curved portions are provided for the edges of all four sides of the display device 200 in this manner, the design can have unity, which is beneficial.

Nevertheless, the curved portion provided on the edge of the lower side of the light-transmitting cover 20 is not arranged to face the boundary between the frame area and display area of the display panel, and is not used as a lens to display an image in the display area, either. That is why in this description, such a curved portion (which is provided off the boundary between the display area and the frame area) will not be hereinafter referred to as a "lens portion".

Figure 10:
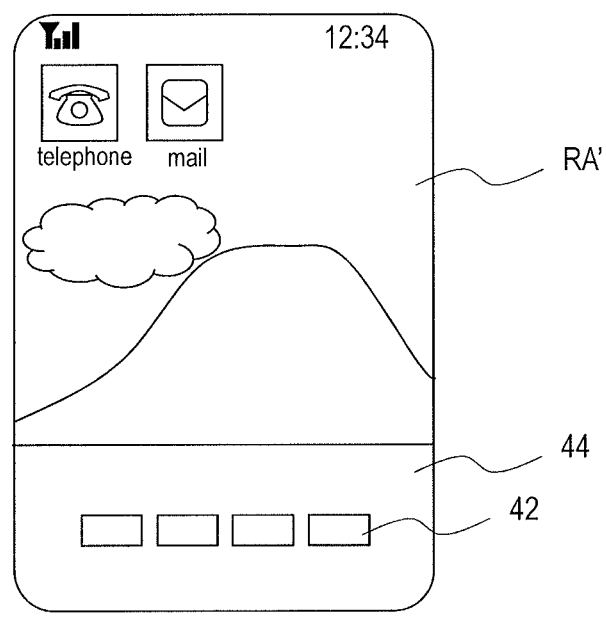
FIG. 10 A plan view illustrating an image which can be seen through a light-transmitting cover in the display device of the second embodiment.

FIG. 10 illustrates an image which the viewer can look at through the light-transmitting cover 20 (in an on-cover display area RA'). As shown in FIG. 10, according to the configuration described above, the image displayed can be expanded onto the frame area RF on all sides of the display panel but the one side corresponding to the frame 44 under the screen (i.e., on three sides of the display panel).

In addition, since the display device 200 of this embodiment includes a lateral housing portion 26 which covers the side surfaces of the display panel 10, it is possible to prevent dust from entering the display panel 10 and to increase the panel's impact resistance. Naturally, the housing shape illustrated is just an example. As long as the housing includes a housing portion to cover the panel's side surfaces, the housing may have any other shape.

Embodiment 3

A display device which performs image transformation processing will be described as a third embodiment. The display device of this embodiment may have almost the same configuration as the smartphone 200 of the second embodiment, but further includes a processor which processes image data and which includes an image transformation processing section. The image transformation processing section may have its function performed by hardware (such as a GPU) or by software. If the image transformation processing section is implemented by software, the function of the image transformation processing section may be performed by executing a computer program on a known operation system.

The image transformation processing section transforms a general rectangular full-screen image, for example, into an image which matches the shape of the display panel and light-transmitting cover with chamfered portions (i.e., the shape of an on-cover display area RA').

Figure 11:
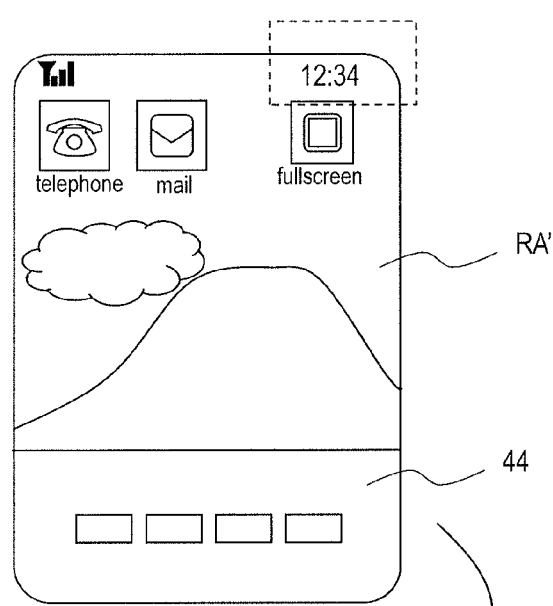
FIG. 11 Illustrates a display device according to a third embodiment, wherein (a) illustrates an image displayed after image transformation processing, (b) illustrates how the display location changes as a result of the image transformation processing, and (c) illustrates how a reduced full-screen image is displayed as a result of resizing processing.
Figure 11:
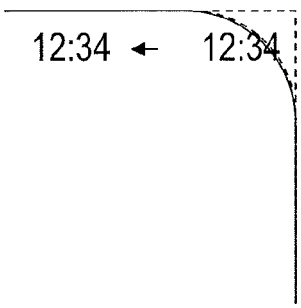
Figure 11:
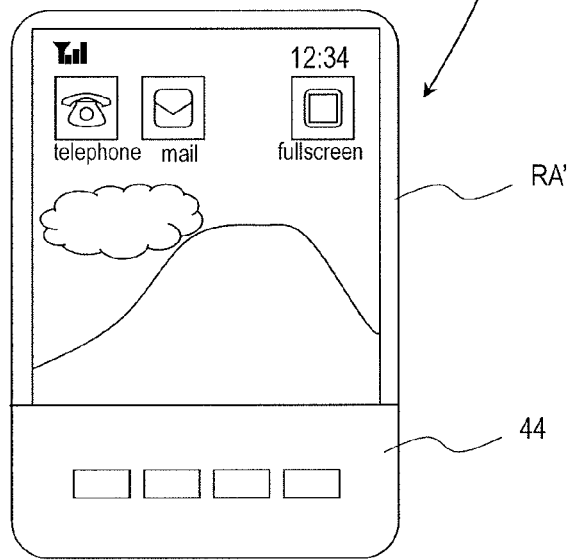

If a chamfered portion has been formed at a corner portion of the display panel and if there are pixels at the corner portion, then image data to be input to those pixels will not be displayed (and will be hereinafter referred to as "non-display data"). Thus, if the non-display data includes any piece of important information such as the current time or the reception sensitivity of the phone as shown in FIG. 11(b), the data is suitably transformed in advance so as to be displayed at an inwardly shifted position and not to be hidden partially. As a result, the image can also be displayed on the frame area of the display panel through the lens portions of the light-transmitting cover and such a piece of important information which has been displayed at an end of the screen can be displayed at a more appropriate inwardly shifted position on the panel as shown in FIG. 11(a).

Furthermore, it is also effective to provide a manipulating button to turn ON and OFF a full-screen display mode (which may be either a manipulating button on the touchscreen panel or a physical button) at a smaller size so that every piece of data can be displayed. When this button is pressed, the image processing section performs the processing of resizing (i.e., reducing the size of) the overall image and then the processing of displaying the resized image in a narrower rectangular area. As a result, a resized rectangular image (i.e., a reduced full-screen image) is displayed entirely within the display screen RA' as shown in FIG. 11(c). By pressing the same button again, this reduced full-screen image can be restored into the original image again. Optionally, while such a reduced full-screen image is being displayed, another image may be displayed outside of the former image. For example, a frame image which has been provided separately may be displayed outside of the reduced full-screen image.

Although it has been described how to perform image processing on a smartphone, the same image processing can also be performed even if the display device is a personal computer monitor, a TV monitor or a tablet terminal.

Embodiment 4

A display device in which the chamfered portions of the display panel 10 and the outer edges of the display area (i.e., the outer edges of the pixel arranged area) have a different shape from their counterparts described above will be described as a fourth embodiment. In the following description, any component having substantially the same function as its counterpart of the first embodiment is identified by the same reference numeral as its counterpart's and description thereof will be omitted herein.

Figure 12:
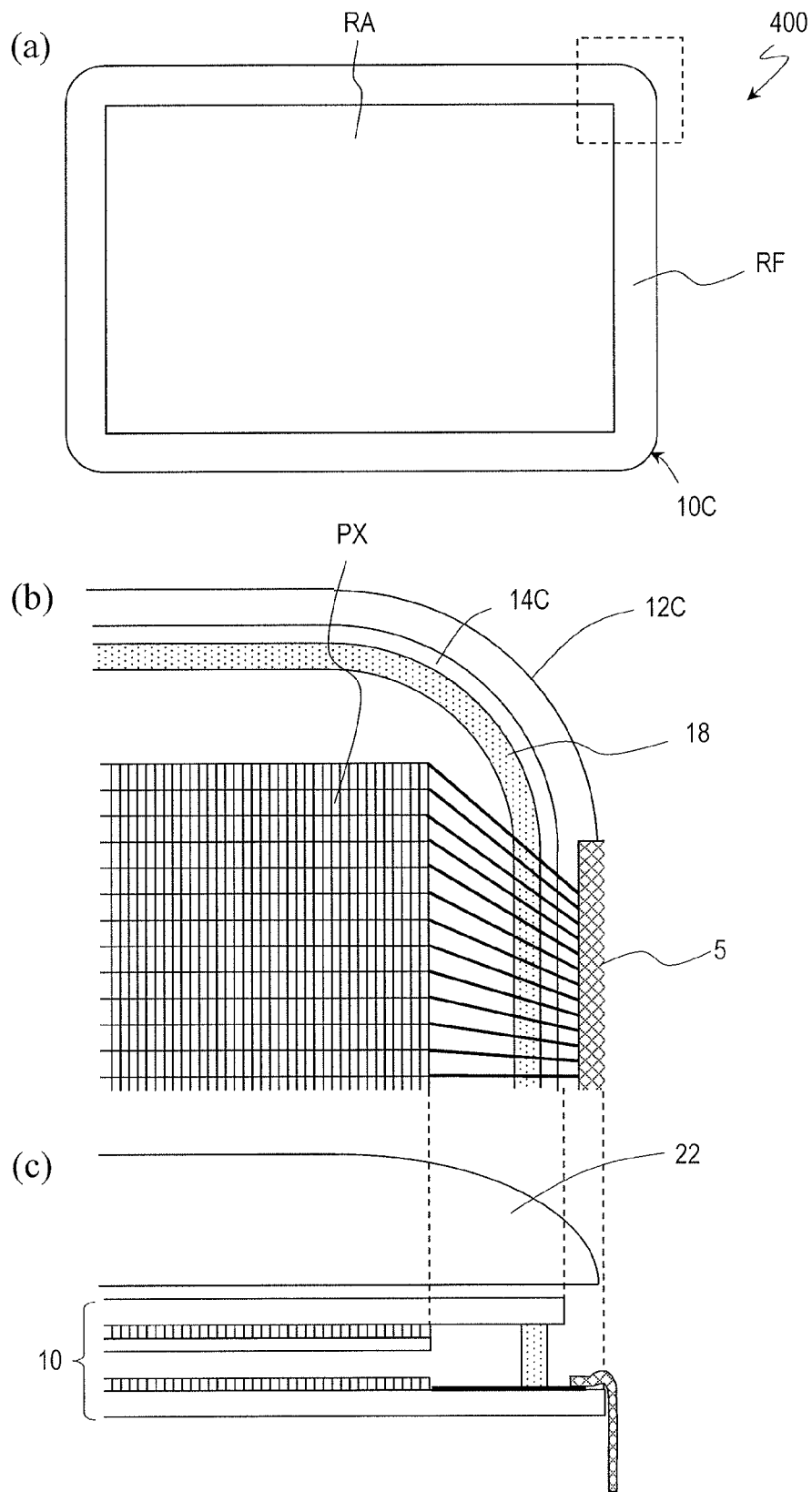
FIG. 12 Illustrates a configuration for a display device according to a fourth embodiment, wherein (a) is a plan view thereof and (b) and (c) are respectively a plan view and cross-sectional view thereof illustrating a corner portion and its surrounding portion on a larger scale.

FIGS. 12(a) to 12(c) illustrate an embodiment in which the outer edges of the area where the pixels PX are arranged do not have a shape corresponding to that of the chamfered portions 10C of the display panel 10 or the seal member 18 at each corner portion. Even if the outer edges of the display area are angled (i.e., even if the display area is rectangular) in this manner but if circular arc chamfered portions 10C have been provided at corner portions of the display panel 10 (e.g., at the corner portions of the TFT substrate 12 in this example), an image can also be displayed over the frame area by arranging a light-transmitting cover, of which the corner lens portions have a corresponding shape.

Figure 13:
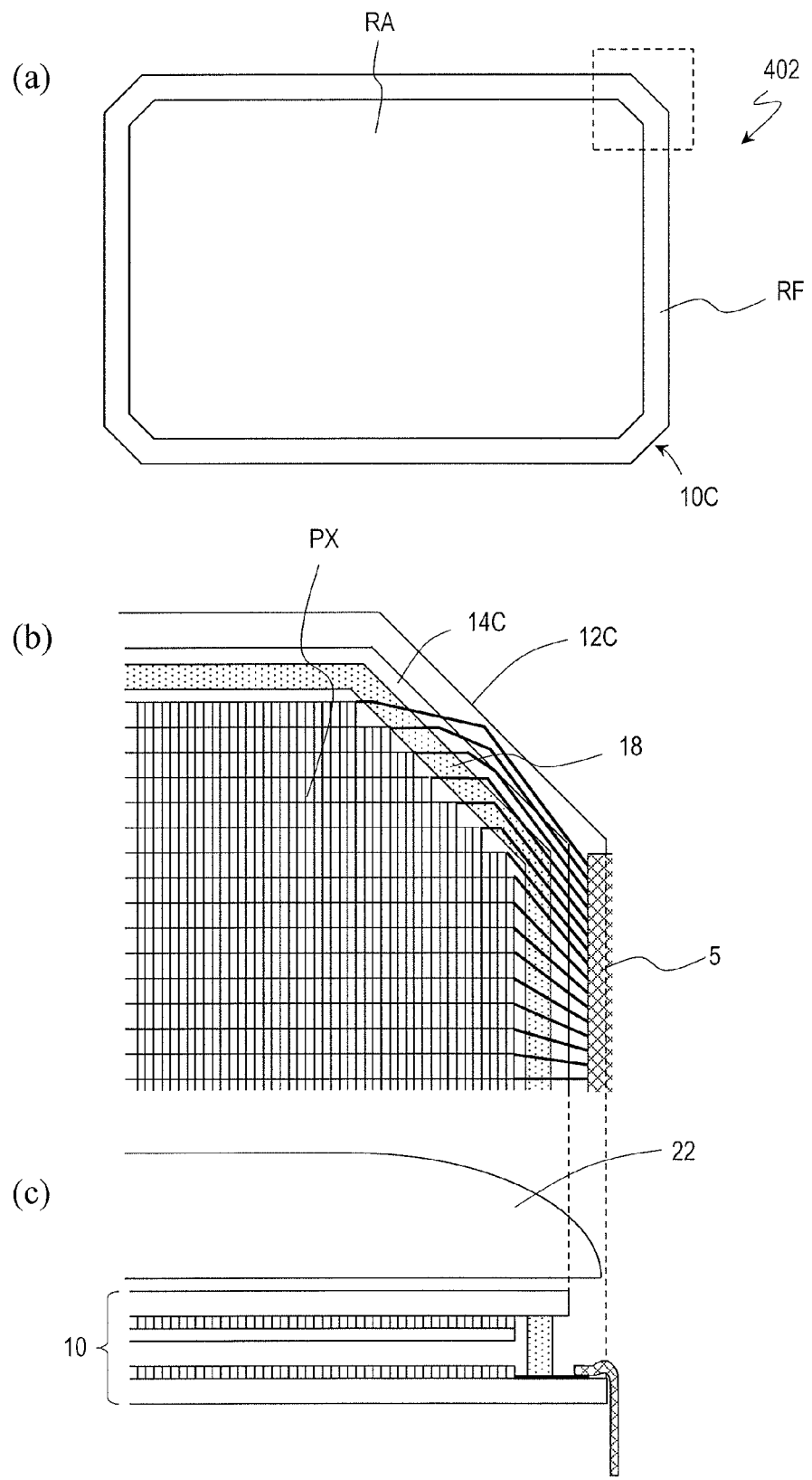
FIG. 13 Illustrates a configuration for a display device according to a modified example of the fourth embodiment, wherein (a) is a plan view thereof and (b) and (c) are respectively a plan view and cross-sectional view thereof illustrating a corner portion and its surrounding portion on a larger scale.

FIGS. 13(a) to 13(c) illustrate an embodiment in which the display panel 10 has straight chamfered portions 10C. As can be seen from FIGS. 13(a) to 13(c), the chamfered portions 10C have been formed by cutting the corner portions of the display panel obliquely and straight, instead of cutting them into a circular arc shape. The chamfered portions 10C suitably define an angle of 45 degrees with respect to the respective sides.

Figure 14:
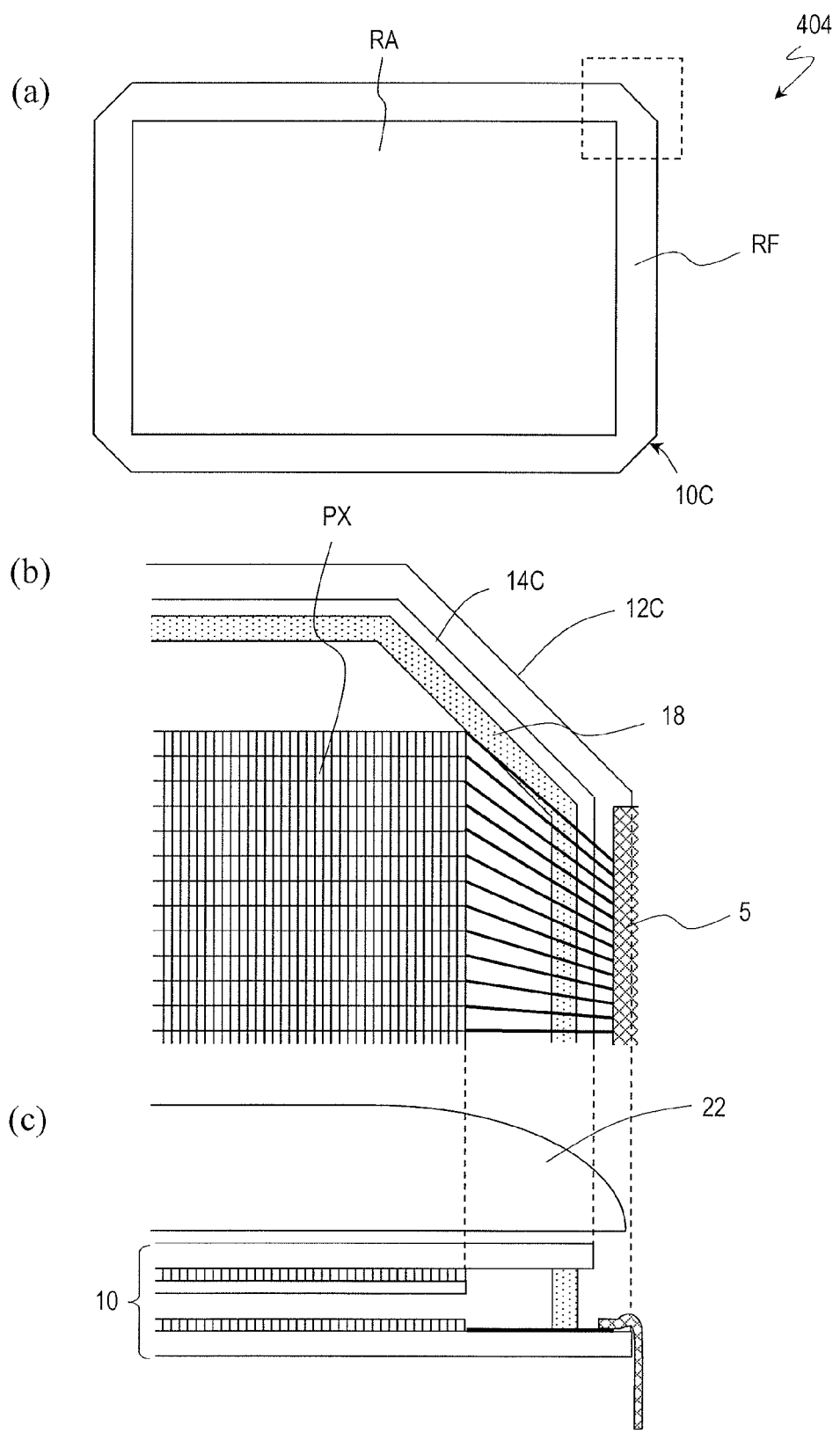
FIG. 14 Illustrates a configuration for a display device according to another modified example of the fourth embodiment, wherein (a) is a plan view thereof and (b) and (c) are respectively a plan view and cross-sectional view thereof illustrating a corner portion and its surrounding portion on a larger scale.

FIGS. 14(a) to 14(c) illustrate an embodiment in which the display panel has obliquely and straight cut chamfered portions 10C as in the embodiment illustrated in FIGS. 13(a) to 13(c) and in which the pixel arranged area does not have a shape corresponding to that of the chamfered portions 10C. If such straight chamfered portions 10C running obliquely have been formed at the corner portions of the display panel 10, then a light-transmitting cover, of which the corner lens portions have a shape corresponding to that of the straight chamfered portions 10C, may be arranged. Then, an image can also be displayed over the frame area.

Embodiment 5

Figure 15:
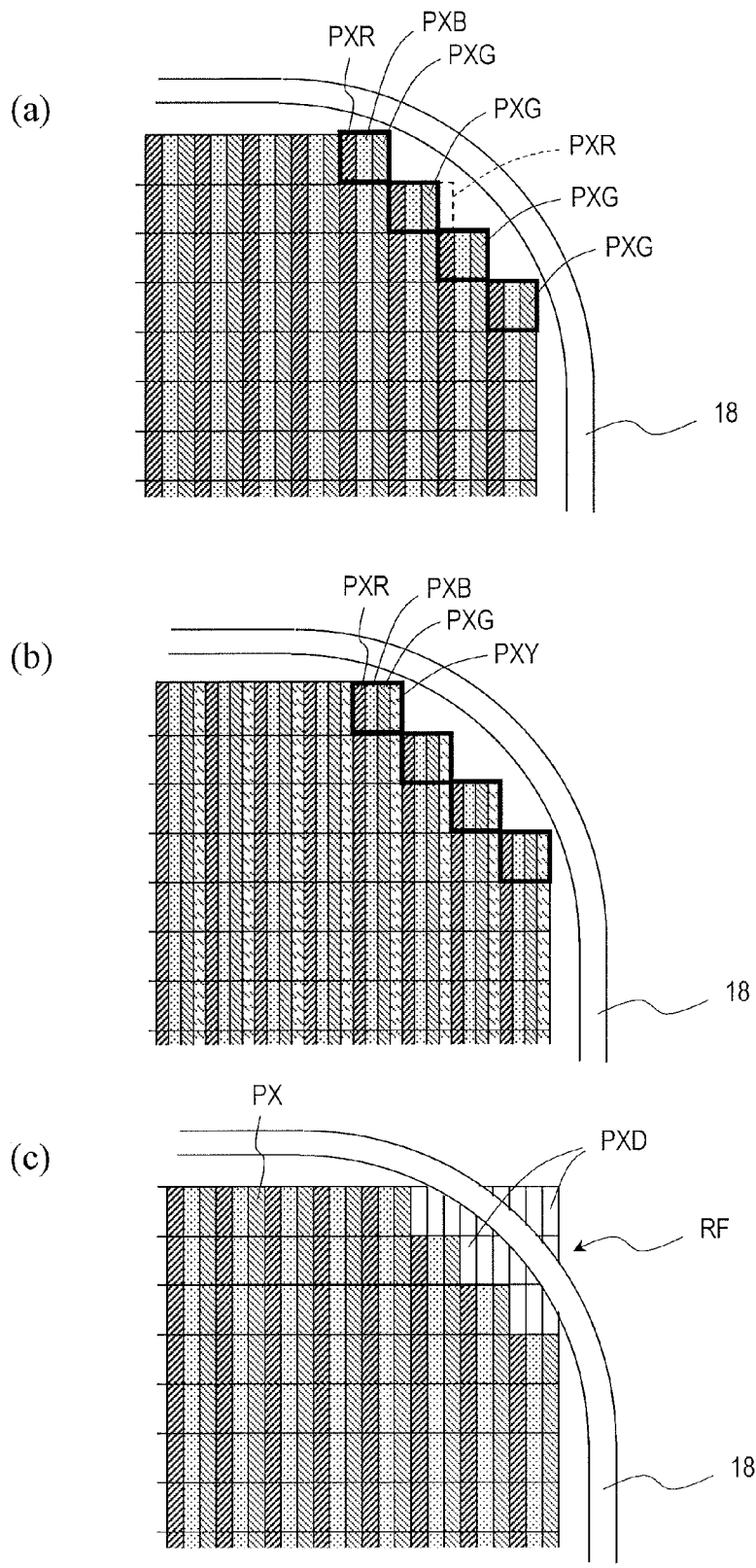
FIG. 15 Illustrates a corner portion of a display device according to a fifth embodiment and its surrounding portion on a larger scale, wherein (a) and (b) respectively illustrate three-color and four-color pixel arrangements and (c) illustrates an arrangement with dummy pixels.

FIGS. 15(a) to 15(c) illustrate exemplary pixel arrangements at a corner portion of a display device according to a fifth embodiment.

If a display operation needs to be performed in colors, pixels (subpixels) PXR, PXB and PXG representing R (red), B (blue) and G (green), respectively, are arranged. Or subpixels PXR, PXG, PXB and PXY representing the four colors R, B, G and Y (yellow) (or R, G, B and W (white)) may be arranged. Naturally, subpixels representing five or more colors may also be arranged.

In a situation where the edges of the pixel arranged area are formed in a stepped shape so as to arrange subpixels representing multiple different colors inside the seal member 18, sometimes the pixels should be arranged on the basis of a pixel consisting of RGB subpixels. The reason is that if there was any pixel consisting of only red subpixels PXR at the end of a row of pixels, the edge might look red, which is a defect to avoid and is a phenomenon to be observed noticeably in a liquid crystal display device with a large pixel size, among other things. The same can be said no only in the case of using RGB color filters but also in the case of using color filters in four or more colors.

Thus, according to this embodiment, pixels are arranged so that each unit pixel consists of three or four subpixels representing mutually different colors as shown in FIG. 15(a) or 15(b), thereby preventing any particular color from being sensed outstandingly. For example, even though there is a space to arrange a red subpixel PXR at the end of the second row of pixels as counted from the top, no red subpixel PXR is arranged there intentionally so that the row of pixels ends with a green subpixel PXG. With such an arrangement adopted, on every row of pixels representing multiple different colors, the pixel arranged at the outermost end will represent the same color.

Optionally, as shown in FIG. 15(c), some pixels PX may be arranged so as to overlap with the seal member 18 or to partially cover the frame area RF, too. Those pixels have been formed as dummy pixels PXD that do not contribute to a display operation. Such a configuration would work in the manufacturing process because the pixels can be arranged in the same way as in a conventional display panel.

Although a display device as an embodiment of the present invention has been described as a liquid crystal display device, this is just an example and the present invention is applicable to a display device of any other type as well. For example, a display device which uses any other display method such as an organic EL panel, a PDP (plasma display panel), an FED (field emission display) panel, an electrophoretic display panel, or a display panel operating in the electro-wetting method may be used as well. When either a self-emitting display panel or a reflective display panel is used, the display device does not have to include the backlight 30 described above.

INDUSTRIAL APPLICABILITY

The present invention can be used extensively in a TV set or any of various other kinds of display devices, and can be used particularly effectively as a display device as an element of a multi-display system functioning as a single big screen.

REFERENCE SIGNS LIST

5 FPC
10 display panel
12 TFT substrate
14 counter substrate
10C, 12C, 14C chamfered portion
15 wiring
16 liquid crystal layer
18 seal member
19 optical film layer
20 light-transmitting cover
22 lens portion
24 flat plate portion
26 lateral housing portion
28 bottom housing portion
30 backlight
40 battery section
100 display device

The invention claimed is:

1. A display device comprising:
   a display panel having a display area and a frame area which is provided outside of the display area; and
   a light-transmitting cover which is arranged closer to a viewer than the display panel is and which includes lens portions that are arranged at positions corresponding to the boundary between the display area and frame area of the display panel, wherein
   the display panel has a planar shape which includes four sides that define upper, lower, right and left sides, respectively, and four corner portions, each connecting two associated adjacent ones of the four sides together, the display panel further having a chamfered portion with a curved or straight edge which is arranged in at least one of the four corner portions inside of the intersection between extended lines of the two adjacent sides,
   the lens portions of the light-transmitting cover include a lens portion, of which the planar shape matches the chamfered portion of the display panel, at a position corresponding to the corner portion of the display panel,
   a plurality of pixels are arranged inside the display area,
   an outer edge of the display area is defined by some of the plurality of pixels that are located in the outermost part of the display area,
   the outer edge of the display area has been formed in a shape corresponding to that of the chamfered portion, and
   if the maximum distance from the outer edge of the display area to an end face of the display panel is a, the thickest part of the lens portions of the light-transmitting cover has a thickness falling within the range of 2.7 a to 4.6 a.

2. The display device of claim 1, wherein the display panel includes:
   a substrate;
   a display medium layer arranged on the substrate; and
   a band-shaped seal member which is arranged on the substrate and inside the frame area so as to surround the display medium layer,
   wherein the seal member runs along the edge of the chamfered portion at the corner portion of the display panel.

3. The display device of claim 1, wherein the outer edge of the display area has been formed to make multiple steps at the corner portion of the display panel.

4. The display device of claim 1, wherein the chamfered portion has a circular arc planar shape defined by a radius of curvature b which falls within the range of 1.6 a to 4.6 a.

5. The display device of claim 1, wherein the light-transmitting cover has the lens portions at respective positions corresponding to all of the four sides and four corner portions of the display panel.

6. The display device of claim 1, wherein the light-transmitting cover has the lens portions at respective positions corresponding to three out of the four sides of the display panel but has no lens portion at a position corresponding to the other side.

7. The display device of claim 1, further comprising an image processing section which transforms image data to be input to each of the plurality of pixels into a different type of image data,
   wherein the image processing section performs data transformation processing so that at least part of image data to be displayed at the corner portions is displayed in an inner area of the panel.

8. The display device of claim 7, wherein the data transformation processing includes processing of resizing the image data.

9. The display device of claim 1, wherein some of the plurality of pixels are associated with multiple different colors, and among the pixels that form the outer edge of the display area at the corner portion, pixels which are located at outermost ends in either a row direction or a column direction represent the same color.

* * * * *